United States Patent
DeCastro et al.

(10) Patent No.: US 10,621,858 B1
(45) Date of Patent: Apr. 14, 2020

(54) SYSTEMS AND METHODS FOR IMPROVING SITUATIONAL AWARENESS OF A USER

(71) Applicant: Toyota Research Institute, Inc., Los Altos, CA (US)

(72) Inventors: Jonathan DeCastro, Arlington, MA (US); Frank Permenter, Cambridge, MA (US); Soonho Kong, Arlington, MA (US); Nikos Arechiga Gonzalez, San Mateo, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 16/268,617

(22) Filed: Feb. 6, 2019

(51) Int. Cl.
*G08G 1/095* (2006.01)
*G08G 1/005* (2006.01)
*G01C 3/08* (2006.01)
*G01B 11/22* (2006.01)

(52) U.S. Cl.
CPC ............. *G08G 1/005* (2013.01); *G01B 11/22* (2013.01); *G01C 3/08* (2013.01)

(58) Field of Classification Search
CPC ........... G08G 1/005; G01B 11/22; G01C 3/08
USPC ......... 340/944, 905, 907, 540, 573.1, 686.1, 340/670; 381/55, 56, 71.4
See application file for complete search history.

(56) References Cited

U.S. PATENT DOCUMENTS

| | | | |
|---|---|---|---|
| 8,543,261 B2 | 9/2013 | Anderson et al. | |
| 9,107,012 B2 | 8/2015 | Lord et al. | |
| 9,182,761 B2 | 11/2015 | Fujita | |
| 9,505,346 B1 | 11/2016 | Yamada | |
| 9,613,521 B2 * | 4/2017 | Hunter | G09F 27/00 |
| 9,725,040 B2 | 8/2017 | Tan et al. | |
| 9,741,169 B1 | 8/2017 | Holz | |
| 9,823,741 B2 | 11/2017 | Klanner et al. | |
| 9,911,309 B1 * | 3/2018 | Kumagai | G08B 21/22 |
| 10,043,320 B2 | 8/2018 | Holz et al. | |
| 2003/0053659 A1 | 3/2003 | Pavlidis et al. | |
| 2012/0050144 A1 | 3/2012 | Morlock | |
| 2013/0144490 A1 | 6/2013 | Lord et al. | |
| 2015/0110285 A1 * | 4/2015 | Censo | B60Q 5/006 381/71.4 |
| 2015/0149088 A1 | 5/2015 | Attard et al. | |

(Continued)

OTHER PUBLICATIONS

"ARCore an Overview", retrieved from: https://developers.google.com/ar/discover/ on Nov. 19, 2018.

(Continued)

*Primary Examiner* — Tai T Nguyen

(74) *Attorney, Agent, or Firm* — Christopher G. Darrow; Darrow Mustafa PC

(57) ABSTRACT

System, methods, and other embodiments described herein relate to improving situational awareness of a user. In one embodiment, a method includes, in response to acquiring, in a personal device, sensor data from a set of sensors that perceive a surrounding environment of the user, identifying from the sensor data one or more objects in the surrounding environment relative to the user. The method includes determining a threat to the user from the one or more objects according to at least trajectories of the one or more objects embodied in the sensor data. The method includes generating, via the personal device, an indicator to inform the user of the one or more objects according to the threat.

20 Claims, 6 Drawing Sheets

(56) References Cited

U.S. PATENT DOCUMENTS

| | | |
|---|---|---|
| 2016/0171860 A1 | 6/2016 | Hannigan et al. |
| 2016/0202081 A1 | 7/2016 | Debieuvre et al. |
| 2016/0207457 A1* | 7/2016 | Border ............... G02B 27/0172 |
| 2017/0078652 A1 | 3/2017 | Hua et al. |
| 2017/0161950 A1 | 6/2017 | Seder et al. |
| 2017/0329332 A1 | 11/2017 | Pilarski et al. |
| 2017/0372592 A1 | 12/2017 | Neravati et al. |
| 2018/0035097 A1 | 2/2018 | Ohishi et al. |
| 2018/0050635 A1* | 2/2018 | Vincent .................. B60Q 5/006 |

OTHER PUBLICATIONS

"ARKit 2", retrieved from: https://developer.apple.com/arkit/ on Nov. 19, 2018.

\* cited by examiner

SYSTEMS AND METHODS FOR IMPROVING SITUATIONAL AWARENESS OF A USER

TECHNICAL FIELD

The subject matter described herein relates, in general, to improving the situational awareness of a user such as a pedestrian, and, more particularly, to informing the user about when dynamic objects that are being tracked pose a threat.

BACKGROUND

Motor vehicle accidents involving pedestrians are a common occurrence. In addition to laws that are formulated to protect pedestrians, some vehicles include systems that facilitate preventing collisions with obstacles such as pedestrians. However, accidents with pedestrians remain relatively common. In at least one regard, pedestrian-related accidents may be attributed to the pedestrians themselves. That is, the ability of pedestrians to safely interact in a transportation-centered environment (e.g., crossing roads, walking along the side of a road, etc.) can be limited by the ability of the pedestrians to perceive threats. Consider that a pedestrian is generally focused on aspects of the environment occurring in a forward direction of the pedestrian that corresponds with a direction of travel. Intrinsically, visual perceptions of the pedestrian, and to some extent auditory perceptions, align with a forward direction. While a safety-minded pedestrian may attempt to maintain awareness about all directions of a surrounding environment, ultimately abilities of the pedestrian to perceive the environment are limited especially when considering how quickly objects in the surrounding environment, such as vehicles, move in relation to the pedestrian. Thus, even safety-minded pedestrian can be at risk of having accidents with vehicles or other dynamic objects as a result of these intrinsic limitations.

SUMMARY

Example systems and methods disclosed herein relate to improving the situational awareness of pedestrians. As previously noted, the ability of pedestrians to maintain a high level of awareness of surroundings is difficult. Because of intrinsic aspects of how people perceive the surrounding environment, and, in some cases, because of the highly distracted nature of people engaged with electronic devices, maintaining awareness of surroundings is difficult. As such, the frequency of accidents with pedestrians remains significant. Moreover, outfitting pedestrians with the ability to better perceive the surrounding environment can also be difficult.

For example, because of the mobile nature of pedestrians (e.g., lack of access to consistent electric power), outfitting a pedestrian with sensors and computing devices to facilitate the situational awareness of the pedestrian has been generally infeasible. That is, because processing sensor data can be computationally intensive thereby necessitating significant amounts of power (e.g., large batteries), and more robust computing devices, equipping a pedestrian with sensors and devices to achieve such functionality can represent a potentially cumbersome configuration of components while still encountering energy limitations from included batteries.

Therefore, in one embodiment, a system is disclosed that improves awareness of a pedestrian by automatically tracking dynamic objects in a surrounding environment and informing the pedestrian of threats. In one approach, the system leverages sensors integrated with, for example, various apparel items of the pedestrian in order to streamline integration with the pedestrian. That is, the system can include sensors such as cameras embedded in glasses, hats, and so on. Moreover, the included sensors, in one approach, provide a supplemented or improved observation of the surrounding environment in terms of degrees of observation about the pedestrian, resolution, and so on that is beyond what the pedestrian is capable of independently resolving.

Using observations from the sensors, the system identifies, tracks, and predicts when dynamic objects in the surrounding environment pose a threat to the user. Thus, according to this assessment, the system can inform the pedestrian via a heads-up display (HUD) or other user interface (UI) element about the threats in order to improve awareness of the pedestrian. Moreover, the system, in one embodiment, functions intelligently according to available resources of a mobile device that is processing the sensor data to selectively adapt the processing. In order to, for example, provide for efficient operation of the system in a mobile environment, the system adaptively adjusts aspects of the processing according to available resources such as which objects are tracked, which sensor data is processed, and so on. In this way, the system improves pedestrian awareness through supplementing abilities of the pedestrian while doing so using an adaptable approach that dynamically adjusts to operating conditions in order to facilitate operation in a mobile context.

In one embodiment, a safety system for improving situational awareness of a user is disclosed. The safety system includes one or more processors and a memory communicably coupled to the one or more processors. The memory stores a sensor module including instructions that when executed by the one or more processors cause the one or more processors to, in response to acquiring, in a personal device, sensor data from a set of sensors that perceive a surrounding environment of the user, identify from the sensor data one or more objects in the surrounding environment relative to the user. The memory further stores a threat module including instructions that when executed by the one or more processors cause the one or more processors to determine a threat to the user from the one or more objects according to at least trajectories of the one or more objects embodied in the sensor data, and generate, via the personal device, an indicator to inform the user of the one or more objects according to the threat.

In one embodiment, a non-transitory computer-readable medium for improving situational awareness of a user and including instructions that when executed by one or more processors cause the one or more processors to perform one or more functions is disclosed. The instructions include instructions to, in response to acquiring, in a personal device, sensor data from a set of sensors that perceive a surrounding environment of the user, identify from the sensor data one or more objects in the surrounding environment relative to the user. The instructions include instructions to determine a threat to the user from the one or more objects according to at least trajectories of the one or more objects embodied in the sensor data. The instructions include instructions to generate, via the personal device, an indicator to inform the user of the one or more objects according to the threat.

In one embodiment, a method for improving situational awareness of a user is disclosed. In one embodiment, the method includes, in response to acquiring, in a personal device, sensor data from a set of sensors that perceive a surrounding environment of the user, identifying from the sensor data one or more objects in the surrounding environment relative to the user. The method includes determining a threat to the user from the one or more objects according to at least trajectories of the one or more objects embodied in the sensor data. The method includes generating, via the personal device, an indicator to inform the user of the one or more objects according to the threat.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
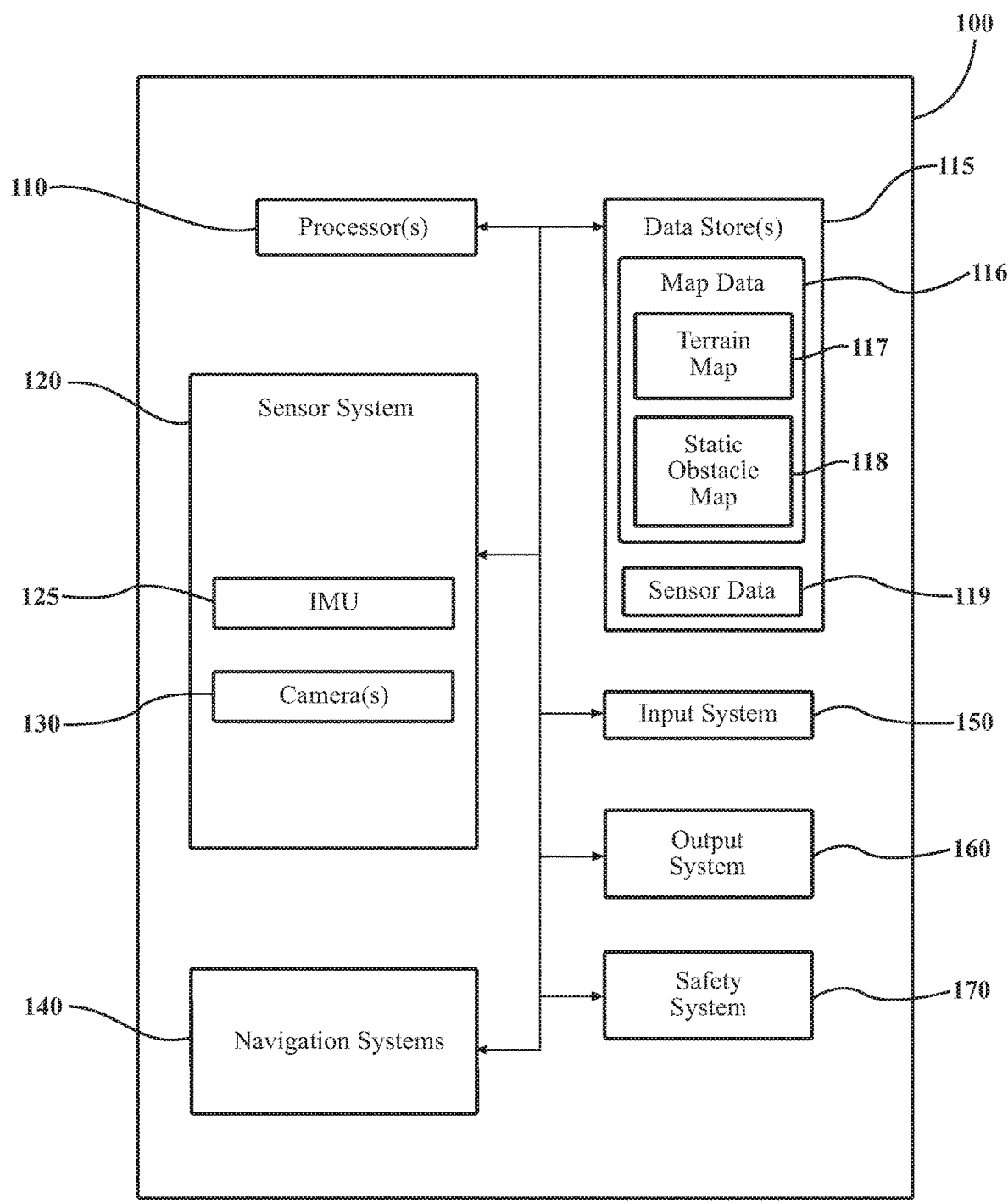
FIG. 1 illustrates one embodiment of a vehicle within which systems and methods disclosed herein may be implemented.

Systems, methods, and other embodiments are disclosed herein associated with improving the situational awareness of pedestrians. As previously noted, the ability of pedestrians to maintain high levels of awareness about surroundings is difficult. This can be especially true in a transportation-based environment that is dynamic and where objects (e.g., vehicles, bicyclists, etc.) move quickly. These types of circumstances can exploit shortcomings in the ability of people to maintain situational awareness because of intrinsic aspects of how people perceive the surrounding environment (e.g., sensory perceptions limited to a forward direction). Additionally, various distracting factors such as electronic devices, other people, advertising, and so on can further complicate the ability of a user to maintain awareness of their surroundings. As such, the incidence of accidents with pedestrians remains significant.

Remedying difficulties with the situational awareness of pedestrians, as disclosed herein, generally involves outfitting pedestrians with the ability to better perceive the surrounding environment. However, because pedestrians are mobile (i.e., moving between locations without access to continuous power), outfitting a pedestrian with robust combinations of sensors and computing devices can be difficult. That is, when considering constraints on weight, storable energy, and so on, equipping a pedestrian with bulky electronic systems to facilitate the noted computations can be impractical.

Therefore, in one embodiment, a safety system is disclosed that improves situational awareness of a pedestrian by leveraging available computational resources of a mobile device to selectively process information about a surrounding environment and inform the pedestrian of potential threats. For example, in one or more embodiments, a disclosed system uses various sensors that are either wired or wireless and are integrated with apparel/accessories worn by the pedestrian. Thus, the safety system can include sensors such as cameras embedded in glasses, hats, jewelry, and so on. Moreover, the sensors provide observations of the surrounding environment that embody an improved field-of-view around the pedestrian including, for example, an area behind and to the sides of the pedestrian that are not directly viewable by the pedestrian without continuous head movement.

Therefore, the safety system uses the observations from the sensors to identify, track, and predict when dynamic objects in the surrounding environment pose a threat to the user. According to this assessment, the safety system can inform the pedestrian via a heads-up display (HUD) or other user interface (UI) element about the threats in order to improve awareness of the pedestrian. Additionally, the safety system itself is, in one or more embodiments, embodied within a personal electronic device of the pedestrian such as a smartphone.

Thus, the safety system, in one embodiment, implements a combination of processes on the personal device to acquire and analyze the sensor data. Consequently, the safety system is, in one approach, implemented with the ability to selectively execute the various processes according to available resources of the device. The safety system may monitor a subset of identified objects, selectively update context, and perform other processing in a selective manner in order to use available resources of the device efficiently. In this way, the safety system improves pedestrian awareness through supplementing abilities of the pedestrian while doing so using an adaptable approach that dynamically adjusts to operating conditions in order to facilitate operation in a mobile context.

Referring to FIG. 1, an example of a device 100 is illustrated. As used herein, a "device" is any electronic device that includes one or more systems that can operate cooperatively to perform the functions disclosed herein. While arrangements will be described herein with respect to a smart phone, it will be understood that embodiments are not limited to phones or even communication devices more broadly. In some implementations, the device 100 may be any electronic computing device such as a smart phone, a tablet, a laptop, or other mobile computing platform that is capable of performing the functionality discussed herein and can be carried by a user such as a pedestrian.

The device 100 also includes various elements. It will be understood that in various embodiments it may not be necessary for the device 100 to have all of the elements shown in FIG. 1. The device 100 can have any combination of the various elements shown in FIG. 1. Further, the device 100 can have additional elements to those shown in FIG. 1. In some arrangements, the device 100 may be implemented without one or more of the elements shown in FIG. 1. While the various elements are shown as being located within the device 100 in FIG. 1, it will be understood that one or more of these elements can be located external to the device 100.

Further, the elements shown may be physically separated by large distances and provided as remote services (e.g., cloud-computing services).

Some of the possible elements of the device 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. However, it should be understood that the embodiments described herein may be practiced using various combinations of these elements.

In either case, the device 100 includes a safety system 170 that functions to improve the situational awareness of an individual. Moreover, while depicted as a standalone component, in one or more embodiments, the safety system 170 is integrated with one or more other components of the device 100 such as a navigation system, an object recognition system, and so on. The noted functions and methods will become more apparent with a further discussion of the figures.

Figure 2:
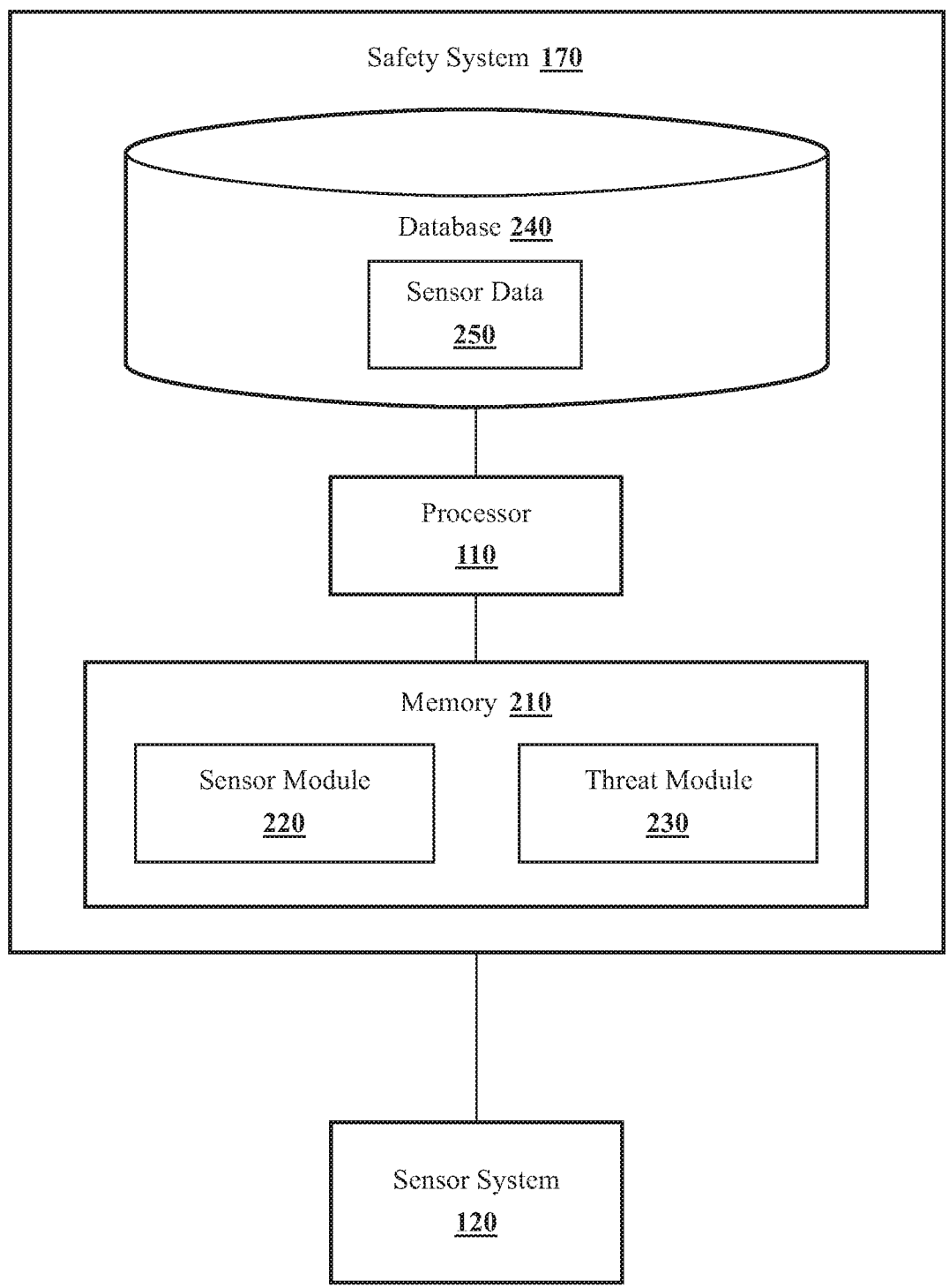
FIG. 2 illustrates one embodiment of a safety system that is associated with improve situational awareness of a user.

With reference to FIG. 2, one embodiment of the safety system 170 is further illustrated. As shown, the safety system 170 includes a processor 110. Accordingly, the processor 110 may be a part of the safety system 170 or the safety system 170 may access the processor 110 through a data bus or another communication path. In one or more embodiments, the processor 110 is an application specific integrated circuit that is configured to implement functions associated with a sensor module 220 and a threat module 230. In general, the processor 110 is an electronic processor such as a microprocessor that is capable of performing various functions as described herein. In one embodiment, the safety system 170 includes a memory 210 that stores the sensor module 220 and the threat module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein.

Furthermore, in one embodiment, the safety system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes sensor data 250 along with, for example, other information that is used by the modules 220 and 230.

Accordingly, the sensor module 220 generally includes instructions that function to control the processor 110 to receive data inputs from a set of sensors. In one embodiment, the set of sensors include, for example, sensors of the device 100 (e.g., sensor system 120), sensors worn by the pedestrian, sensors in communication with the device 100 over a communication link (e.g., infrastructure-based and/or vehicle-based sensors), and so on.

Figure 3A:
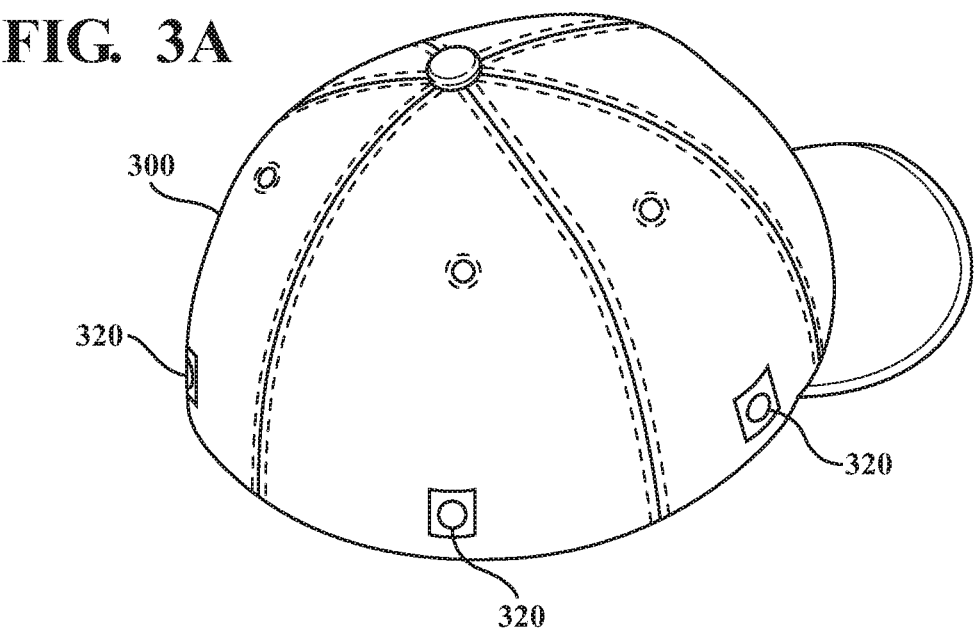
FIG. 3A-C are diagrams illustrating examples of how sensors are integrated into various items.
Figure 3B:
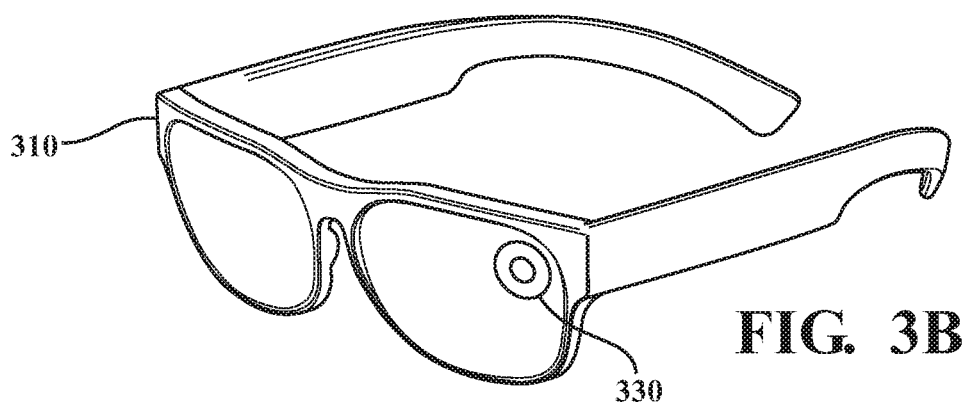
Figure 3C:
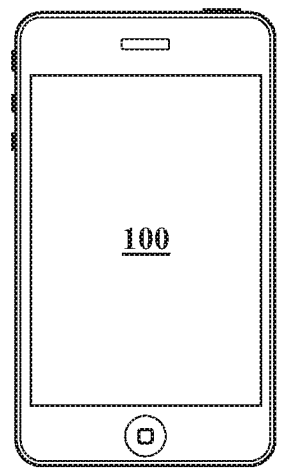

Briefly consider FIG. 3, which illustrates an example configuration of sensors that may be worn by the user and that provide at least a portion of the sensor data 250 to the safety system 170. As illustrated, FIG. 3 includes a hat 300, and glasses 310 with integrated cameras 320 and 330, respectively. The cameras 320 and 330 are in communication with the device 100 in order to provide observations of the surrounding environment to the safety system 170. The cameras 320 as provided in the hat 300 generally ring the hat 300 to provide a comprehensive view around the pedestrian. Of course, in various embodiments, the hat 300 can be implemented to include a different number of cameras and/or other sensors (e.g., microphone, radar, etc.). For example, in one approach, the hat 300 may include a single rear-facing camera to provide observations of an area behind the pedestrian while the glasses 310 include a single forward-facing camera (i.e., camera 330) to provide observations in front of the pedestrian. The cameras 320 and 330 may communicate wirelessly with the device 100 or, in one embodiment, using wired connections.

Moreover, while cameras are generally illustrated, the hat 300, the glasses 310, and the device 100 may include additional types of sensors such as, without limitation, GPS, IMU, and so on. Additionally, the glasses 310, in one embodiment, may be augmented reality (AR) glasses, glasses that include an integrated display (e.g., a HUD), and so on. As will be discussed in greater detail subsequently, the safety system 170 may control a display within the glasses 310 to provide information about identified objects and threats posed by the objects. As a further matter, while FIG. 3 illustrates the hat 300 and the glasses 310, in further embodiments, these elements may be combined into a single piece or separated into further pieces of apparel/accessories. Additionally, while the user is generally discussed as a pedestrian herein, in various approaches, the user is instead a motorcyclist, a bicyclist, or, more generally, an individual that is operating some form of transport whether powered or manually driven. As such, the hat 300, the glasses 310, and/or the device 100 may be combined into a helmet or other suitable configuration of wearable elements.

Continuing with FIG. 2, the set of sensors acquire observations of the surrounding environment of the pedestrian to form the sensor data 250. The sensor module 220, in one embodiment, controls the set of sensors to acquire the sensor data 250 as information that embodies observations of the surrounding environment of the device 100. Thus, the observations embodied in the sensor data 250 include observations of, for example, dynamic and static objects. In general, static objects include features of the surrounding environment such as surrounding roads, crosswalks, sidewalks, still vehicles, posts, trees, and so on. The dynamic objects can include, without limitation, vehicles, motorcycles, bicycles, other pedestrians, animals, and so on.

The safety system 170 may be implemented to use multiple sensors of the device 100 and the noted peripheral sensors discussed in relation to FIG. 3 including, for example, cameras, GPS, microphones, inertial sensors, and so on. It should be appreciated that the disclosed approach can be extended to cover various configurations of the noted sensors such as multiple cameras (e.g., forward-facing, rear-facing, side-facing, etc.) in combination with other sensors and/or sensors of surrounding vehicles/infrastructure leveraged via vehicle-to-everything (v2x) communications, and so on.

Moreover, as a general matter, the sensor module 220, in one approach, acquires the sensor data 250 and processes (i.e., image recognition) the sensor data 250 to generate observations of the surrounding environment. For example, the sensor module 220, in one approach, functions to implement various routines for performing object detection and recognition, localization, lane marker/boundary identification, and so on. Thus, the sensor module 220, in one embodiment, uses the sensor data 250 to identify approaching vehicles, characteristics of the approaching vehicles (e.g., size, speed, etc.), environmental characteristics (e.g., sidewalks, buildings, traffic signs, crosswalks, etc.), and other information that informs the safety system 170 about the presence of various aspects of the surrounding environment.

In either case, the sensor module 220, in one embodiment, controls the respective sensors to provide the data inputs in the form of the sensor data 250. Additionally, while the sensor module 220 is discussed as controlling the various sensors to provide the sensor data 250, in one or more embodiments, the sensor module 220 employs other techniques that are either active or passive to acquire the sensor data 250. For example, the sensor module 220 may passively sniff the sensor data 250 from a stream of electronic information provided by the various sensors to further components within the device 100. Moreover, the sensor module 220 can undertake various approaches to fuse data from multiple sensors when providing the sensor data 250 and/or from sensor data acquired over a wireless communication link (e.g., vehicle-to-vehicle (v2v), WiFi, etc.) from one or more wirelessly enabled sensors and/or systems. Thus, the sensor data 250, in one embodiment, represents a combination of measurements acquired from multiple sensors.

The sensor data 250 itself generally provides information to identify surrounding vehicles, identify lane markings, characteristics of objects in the environment, and so on. Moreover, the sensor module 220, in one embodiment, controls the sensors to acquire the sensor data 250 about an area that encompasses 360 degrees about the pedestrian in order to provide a comprehensive assessment of the surrounding environment. Of course, in alternative embodiments, the sensor module 220 may acquire the sensor data 250 about an area around the pedestrian that is less than a complete 360-degree perspective when, for example, the sensor module 220 does not have access to further information.

Moreover, with further reference to FIG. 2, in one embodiment, the sensor module 220 generally includes instructions that function to control the processor 110 to execute various actions in support of the safety system 170. For example, in one embodiment, the sensor module 220 acquires the sensor data 250 and uses the sensor data 250 to identify objects in the surrounding environment. Thus, in one or more approaches, the sensor module 220 implements one or more object recognition techniques to apply over the sensor data 250 and extract the objects therefrom. The sensor module 220 includes, in one embodiment, a machine learning algorithm (e.g., convolutional neural network) that processes images from the sensor data 250 to identify objects in the images. The objects can include dynamic objects such as vehicles and static objects such as buildings, vegetation, and so on.

In general, the sensor module 220 is, for example, implemented in a manner to resolve aspects of the surrounding environment that can influence the safety of the user. Thus, while the sensor module 220, in one embodiment, is able to resolve fine details of the surrounding environment from the sensor data 250 including static objects (e.g., static vehicles, infrastructure, etc.) and dynamic objects (e.g., objects in motion such as vehicles, bicycles, etc.), the sensor module 220 can bias the processing of the sensor data 250 to extract aspects of the surrounding environment that are of particular interest or relevance (e.g., threats). For example, the sensor module 220, in one approach, identifies objects that are presently moving and discards or ignores determinations about other objects.

In still a further approach, the sensor module 220 selectively identifies dynamic objects with trajectories that track to within a defined proximity of the user. That is, the sensor system 220 can identify dynamic objects from the sensor data 250, determine trajectories for the dynamic objects, and continue to track particular ones of the dynamic objects having a trajectory that when extrapolated defines a path passing within a defined threshold distance (e.g., 20 feet) of the user. Thus, the sensor system 220 can then limit an amount of processing that is undertaken to those dynamic objects that pose potential threats while, in one embodiment, less frequently checking static objects, and other objects in the surrounding environment that are not directly relevant. In this way, the sensor module 220 efficiently uses available resources of the device 100 while still tracking relevant aspects of the surrounding environment.

Additionally, while the sensor module 220 is discussed as identifying and tracking the dynamic objects, in further aspects, the sensor module 220 performs additional actions to resolve the dynamic objects, such as, determining motion/trajectories of the objects, localizing the objects in the surrounding environment according to depth data extracted from the sensor data 250, predicting trajectories/paths according to current trajectories, correlating the predicted trajectories with a trajectory/path of the user, determining when the noted threat threshold is satisfied, and so on.

Moreover, with further reference to FIG. 2, in one embodiment, the threat module 230 generally includes instructions that function to control the processor 110 to execute various actions. For example, in one embodiment, the threat module 230 uses information about the identified dynamic objects to determine a threat to the user. Thus, the threat module 230 can analyze the trajectories of the dynamic objects to determine whether the dynamic objects pose a potential threat. As previously mentioned, the safety system 170 can assess the trajectories of the dynamic objects in relation to the user in order to determine whether a threat exists to the user.

Thus, in one embodiment, the threat module 230 compares the trajectories of the dynamic objects with a location and/or predicted location of the user. If the trajectories pass within a defined threat threshold of the user, then, in one embodiment, the associated dynamic object(s) that satisfy the threshold are labeled as a threat (e.g., risk of harm to the user). In further aspects, the threat module 230 can assess the trajectories of the dynamic objects according to additional contextual information to determine whether the dynamic objects actually pose a threat. For example, in one embodiment, the threat module 230 can selectively adjust the threat threshold according to a position of the user in the environment relative to the dynamic objects.

That is, in isolation without knowledge of a particular location of the user, a trajectory of a moving vehicle may seem like it poses a threat to the user. For example, if the user is standing on a sidewalk near a crosswalk, then vehicles may pass within feet of the user without being considered an imminent threat because of the presence of a curb/barrier and knowledge that the user is on a sidewalk and not in the roadway itself. However, without this knowledge, the threat module 230 may consider a vehicle having a trajectory that passes within several feet of the user as a threat. Therefore, the threat module 230 can improve determinations about threats according to contextual information about the surrounding environment. In one embodiment, the contextual information includes information about a position of the user in the surrounding environment relative to the objects. In other words, the contextual information identifies whether the user is located on a sidewalk, a roadway, a crosswalk, on stairs, on a bridge, and so on, and thus whether the user is within an area of higher risk from the dynamic objects.

Similarly, the contextual information can identify whether a dynamic object or other object is within a particular lane of a roadway, on a sidewalk, in a bike lane, in a parking space, and so on. As such, the contextual information generally serves to define a context of the surrounding environment that is a relationship between the objects and the user, and, thus, constraints that may be implied by such a relationship. The implied constraints may include likely predicted paths, actions of the objects/user according to traffic laws dictated by the context (e.g., stopping at traffic signs/crosswalks, driving on roads versus sidewalks, etc.), and so on. Thus, the threat module 230 can further predict/modify expected trajectories of the dynamic objects according to the contextual information.

Additionally, because performing additional processing such as tracking additional objects, further resolving details of objects, determining the contextual information, and similar tasks consume additional computing resources, in one embodiment, the safety system 170 selectively performs the noted aspects. In one or more embodiments, the threat module 230 monitors the computational resources of the device 100, and, according to the computational resources that are presently available, the threat module 230 performs the additional processing and/or causes the sensor module 220 to perform the additional processing to improve determinations of the threats through additional information (e.g., contextual information) provided by the additional processing.

For example, the computational resources, in one or more approaches, include one or more of resources associated with a processor (e.g., central processing unit (CPU), graphics processing unit (GPU)), memory (e.g., memory usage and/or current bandwidth), data store (e.g., available disk space), communication bandwidth, and so on. Thus, the threat module 230, in one approach, monitors the processor (e.g., processor 110) and a current workload (e.g., percent of processor utilization) presently experienced by the processor to determine whether the processor is capable of performing the additional processing task or tasks without infringing on other tasks being executed by the device 100. As such, the according to the additional processing task or set of tasks that is/are to be undertaken, the threat module 230 monitors the available resources and causes the task(s) to be executed when the resources are available. In further aspects, the threat module 230 considers further factors such as a current battery level, time since a previous execution of the additional process, currently available information about the dynamic objects, a current location (e.g., busy urban area vs rural area), and so on.

In either case, the threat module 230 uses information available about the dynamic objects to determine whether one or more of the dynamic objects represent a threat to the user. As used herein, the term "threat" is generally defined to include a defined level of risk to the user by a dynamic object or a combination of dynamic objects in the surrounding environment. Thus, the threat, in one or more embodiments, defines a threat threshold according to a radius around the user beyond which movements of the dynamic objects are considered, for example, acceptable or safe, while movements within the radius are considered to be a risk to the user and are thus labeled as a threat.

In further aspects, the system 170 defines the radius as a set of radii with increasing levels of risk with closer proximity to the user. In still further aspects, the system 170 implements the threat threshold in an adaptable form such that depending on the contextual information, the threat module 230 adjusts the radius for the threat threshold. For example, the threat module 230 may adjust the threat threshold (e.g., radius), without limitation, according to whether the user is walking on a sidewalk, a crosswalk, a roadway, according to weather conditions, time of day, and so on.

The threat module 230 determines the threat to the user, in one embodiment, by computing current states of the one or more objects including at least the trajectories for the one or more objects. The threat module 230 can then use the trajectories to determine whether the dynamic objects will satisfy the threat threshold. That is, for example, the threat module 230 predicts future paths/trajectories for the one or more dynamic objects out to a prediction horizon (e.g., x seconds into the future) in order to determine whether the one or more dynamic objects are following paths that intersect with the radius defined around the user. Thus, if the threat module 230 identifies a threat to the user when, for example, the threat module 230 determines that the dynamic objects have a predicted trajectory/path that intersects with the user within the defined threat threshold. As such, in one embodiment, the threat module 230 may also predict a path/trajectory of the user in order to determine whether the radius defined by the threat threshold is breached by the one or more dynamic objects relative at a relevant point of time in the future within the prediction horizon.

The threat module 230, in one embodiment, generates an indicator to inform the user of the one or more objects when determined to be a threat. The threat module 230 can generate the indicator as a visual and/or audible indicator through the device 100. For example, in one or more approaches, the threat module 230 generates the indicator as a visual alert within a display a display of the device and/or within a display of an accessory such as glasses worn by the user (e.g., glasses 310). The threat module 230 can generate the indicator as a visual element in an augmented reality (AR) display or as an indicator within a two-dimensional display. Thus, the threat module 230, in one approach, generates the indicator as an overlay of the actual dynamic object as viewed through, for example, the glasses 310 of FIG. 3. As noted, the threat module 230 can also generate an audible alert via the device 100 (either directly or through earphones/ear buds) as a supplement to the visual or as an alternative, as haptic feedback, and so on.

In further aspects, the threat module 230 dynamically adjusts information provided to the user depending on the determination of the threat. For example, the threat module 230 can initially, upon detection of a dynamic object, provide information such as a visual identifier representing a direction of the dynamic object, a direction of travel of the dynamic object and so on. Accordingly, when system 170 determines that the dynamic object is a threat, the threat module 230 can then intensify the original visual information to generate the indicator and/or provide a separate indicator to inform the user about the threat. In either case, the safety system 170 functions to improve situational awareness of the user by tracking objects and informing the user of threats posed by the dynamic objects. It should be appreciated that the form of the indicator can vary according to an implementation of the particular display. That is, where the system 170 includes or can access a display of an augmented reality device (e.g., the glasses 310), then the indicator can be provided as a graphic overlay of the object itself when in view of the user. Additionally, or alternatively, the indicator can be provided as a visual representation in a HUD, as a simple light, or in another visual form.

Figure 4:
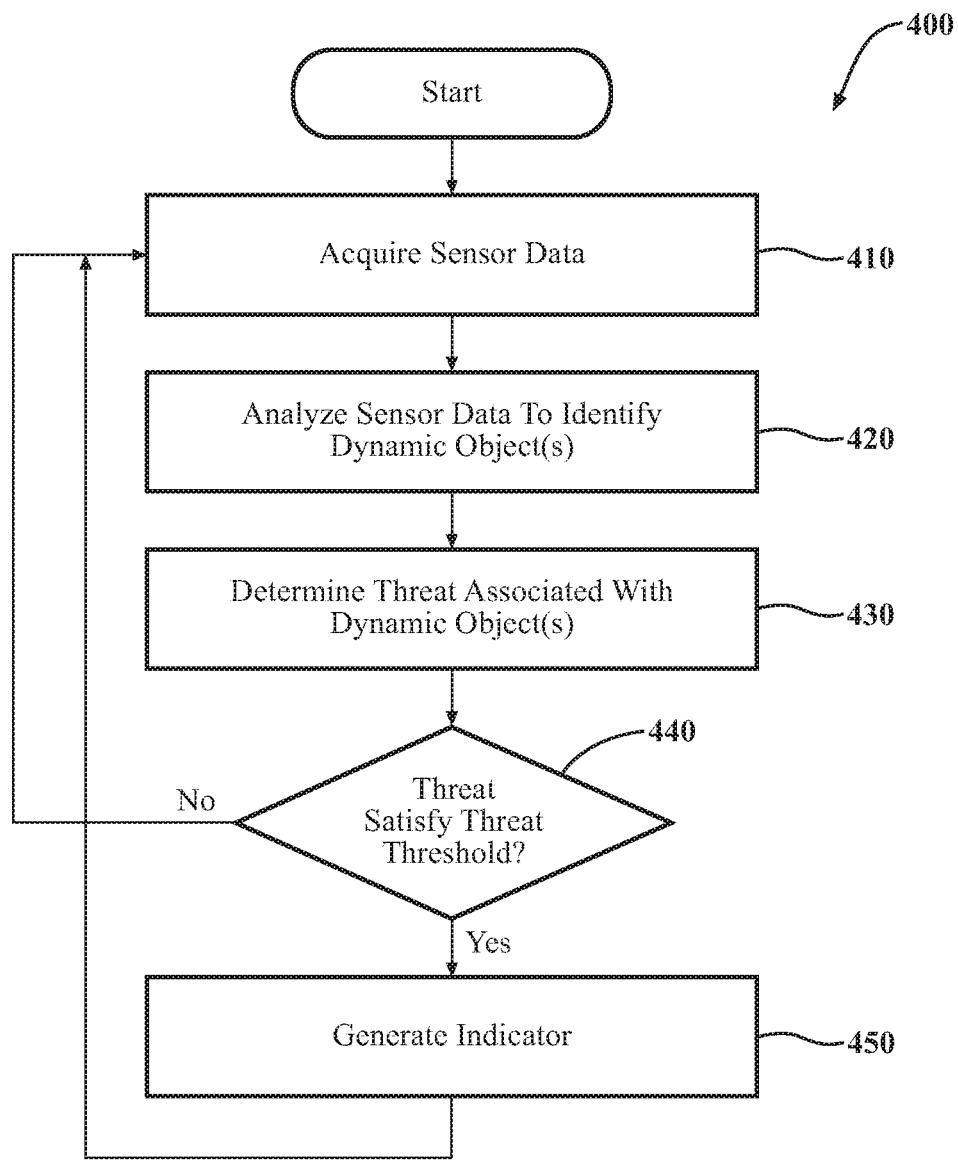
FIG. 4 is a flowchart illustrating one embodiment of a method associated with assessing threats to a user.

Additional aspects of improving situational awareness of a user will be discussed in relation to FIG. 4. FIG. 4 illustrates a flowchart of a method 400 that is associated with detecting dynamic objects around a user and informing the user of threats from the objects. Method 400 will be discussed from the perspective of the safety system 170 of FIGS. 1-2. While method 400 is discussed in combination with the safety system 170, it should be appreciated that the method 400 is not limited to being implemented within the safety system 170 but is instead one example of a system that may implement the method 400.

At 410, the sensor module 220 acquires the sensor data 250 from the set of sensors. As previously mentioned, the set of sensors include cameras integrated into clothing, accessories, or other elements worn by the user (e.g., hats, helmets, glasses, etc.). In one embodiment, the sensor module 220 acquires the observations from the set of sensors including, for example, sensors of the device 100 in order to derive an understanding of the surrounding environment. In particular, the sensor module 220 extracts dynamic objects from the sensor data 250 so that the system 170 can track and assess potential threats to the user. Moreover, in additional/alternative embodiments, the sensor module 220 further acquires information from the set of sensors to provide contextual information about the surrounding environment, a trajectory of the user, weather, time of day, and so on. In this way, the system 170 can use the additional information to further refine determinations about potential threats in the surrounding environment.

The sensor module 220 may acquire the sensor data 250 to include images such as stereo images, infrared images, still images, video images, or another form. Whichever form the sensor module 220 acquires from available image sensors, it should be appreciated that the images provide at least a field-of-view (FOV) encompassing a forward direction of the user. In further aspects, the images further include rear and side views in relation to the user. Thus, the sensor module 220 may separately process the images or may fuse the images together in a single representation. Additionally, as noted, the sensor data 250 can also include information from microphones, inertial measurement units (IMU), and other available sensors to supplement the sensor data 250.

At 420, the sensor module 220 analyzes the sensor data 250 to identify objects in the surrounding environment relative to the user. In particular, the sensor module 220, in one embodiment, identifies dynamic objects that are moving throughout the surrounding environment. Thus, as one approach, the sensor module 220 analyzes the images using one or more image recognition techniques (e.g., a machine learning algorithm such as a convolutional neural network (CNN)) to identify the presence of objects such as vehicles in the surrounding environment. Moreover, the particular recognition technique implemented by the sensor module 220 may be altered or supplemented to identify dynamic objects. For example, the sensor module 220 can implement a machine learning algorithm that includes one or more additional layers (e.g., layers of a neural network) to consider motion data associated with the identified objects. In this way, the sensor module 220 distinguishes between static and dynamic objects in the surrounding environment.

Moreover, the sensor module 220, in one embodiment, uses the machine learning algorithm to resolve a current state (i.e., current location and trajectory for each dynamic object) of the dynamic object(s). Thus, the sensor module 220 processes the sensor data 250 over one or more acquisitions of the sensor data 250 (i.e., one or more time steps) to determine speed, heading, pose, location, and so on as aspects of the current state. In general, the sensor module 220 implements one or more processing mechanisms such as machine learning algorithms, statistics-based models, parametric functions, heuristics, and so on in order to derive the current state from the sensor data 250.

Thus, the sensor module 220 generally functions to acquire the sensor data 250 and identify dynamic object(s) in the surrounding environment and useful information associated with the separate dynamic objects. It should be noted, that while the safety system 170 is generally discussed as determining the presence of threats from the dynamic objects, more broadly, the safety system 170 can also inform the user about the dynamic objects and/or static objects along with information associated therewith in order to further inform the user. Thus, in one approach, the safety system 170 displays information about the detected objects to the user through, for example, a display within the device 100 and/or within a display communicatively coupled with the device 100 (e.g., glasses 310). In this way, the safety system 170 can further serve as a mechanism to provide general information about the surrounding environment to the user.

At 430, the threat module 230 analyzes the dynamic objects to determine potential threats within the surrounding environment. In one embodiment, the threat module 230 uses the information derived by the sensor module 220 to generate predicted trajectories for the dynamic objects. For example, the threat module 230 uses the current states (e.g., current trajectories) to predict future trajectories/paths of the dynamic objects out to a prediction horizon (e.g., x seconds into the future). The threat module 230 can then relate the predicted paths of the dynamic objects to the user, as explained subsequently at block 440, in order to determine whether the respective dynamic objects are a threat.

As an additional aspect, the threat module 230 may also determine potential interactions between the dynamic objects. That is, the threat module 230 can compare the predicted paths of the dynamic objects to determine whether the paths intersect with one another. Such an occurrence can be labeled within state information of the objects and used by the threat module 230 when determining threats subsequently (i.e., whether the potential collision could impact the user and thus represent a threat).

Moreover, in one embodiment, the threat module 230 further determines a current state of the user. That is, the threat module 230 determines whether the user is standing still, or moving according to the sensor data 250 that includes, for example, data from an IMU of the device 100, GPS data, and/or other data that is indicative of movements of the user. Thus, the threat module 230 uses the available information from the sensor data 250 to determine a trajectory (e.g., speed and direction of movement) of the user. In further aspects, the threat module 230 can extrapolate the trajectory of the user according to the prediction horizon used in correlation with predicting the paths of the dynamic objects.

At 440, the threat module 230 determines whether the identified dynamic objects satisfy a threat threshold and are thus a threat to the user. In one embodiment, the threat module 230 analyzes the predicted paths/trajectories of the dynamic objects according to a threat threshold. As previously noted, the threat threshold can be determined differently according to various implementations; however, in general, the threat threshold defines a radius or sphere of risk around the user. Thus, the threat module 230 determines whether the dynamic objects satisfy the threat threshold according to whether, in one example, the predicted paths that are extrapolated from the current states of the dynamic objects intersect with the sphere/radius about the user. That is, if the path passes within the radius, which defines an acceptable proximity to the user before a likelihood of risk is too great, then the threat module 230 identifies the associated dynamic object as a threat. The radius, as indicated, can of course vary according to different conditions (e.g., speed of the user, speed of the dynamic objects, contextual information, etc.) but is generally defined as a distance from the user within which a moving dynamic object is too close to ensure the safety of the user and thus may intersect with the actual user causing a collision. In various approaches, the threat module 230 defines the radius to accommodate uncerntainty associated with various estimates of position. For example, the threat module 230, in one approach, accounts for uncertainty in GPS measurements of the position of the pedestrian, localization uncertainty in the estimates of positions for the dynamic objects, and so on. It should be appreciated that various data from different sensors may have intrinsic uncertainty associated therewith that the threat module 230 accounts for when generating the position estimates and the radius.

At 450, the threat module 230 generates an indicator to inform the user of the one or more objects according to the threat. In one embodiment, the threat module 230 electronically transmits a control signal to one or more components of the device 100 in order to cause the device 100 to produce the indicator through an output system such as a connected display. Thus, the threat module 230 generates the indicator as, in one embodiment, a visual message (e.g., symbol, phrase, animation, etc.) to the user in order to inform the user of the threat and thereby improve the situational awareness of the user in relation to the particular dynamic object. It should be appreciated that as used herein the phrase "situational awareness" generally refers to knowledge of the user about the dynamic objects and conditions of the surrounding environment and, in particular, comprehension of the user about risks posed by the dynamic objects.

Furthermore, in one or more embodiments, the threat module 230 may also use other informative mechanisms to generate the indicator. That is, the threat module 230 may control an audio component within the device 100 to emit audible signals about the threat to inform the user, haptic feedback, and/or other available mechanisms.

Figure 5:
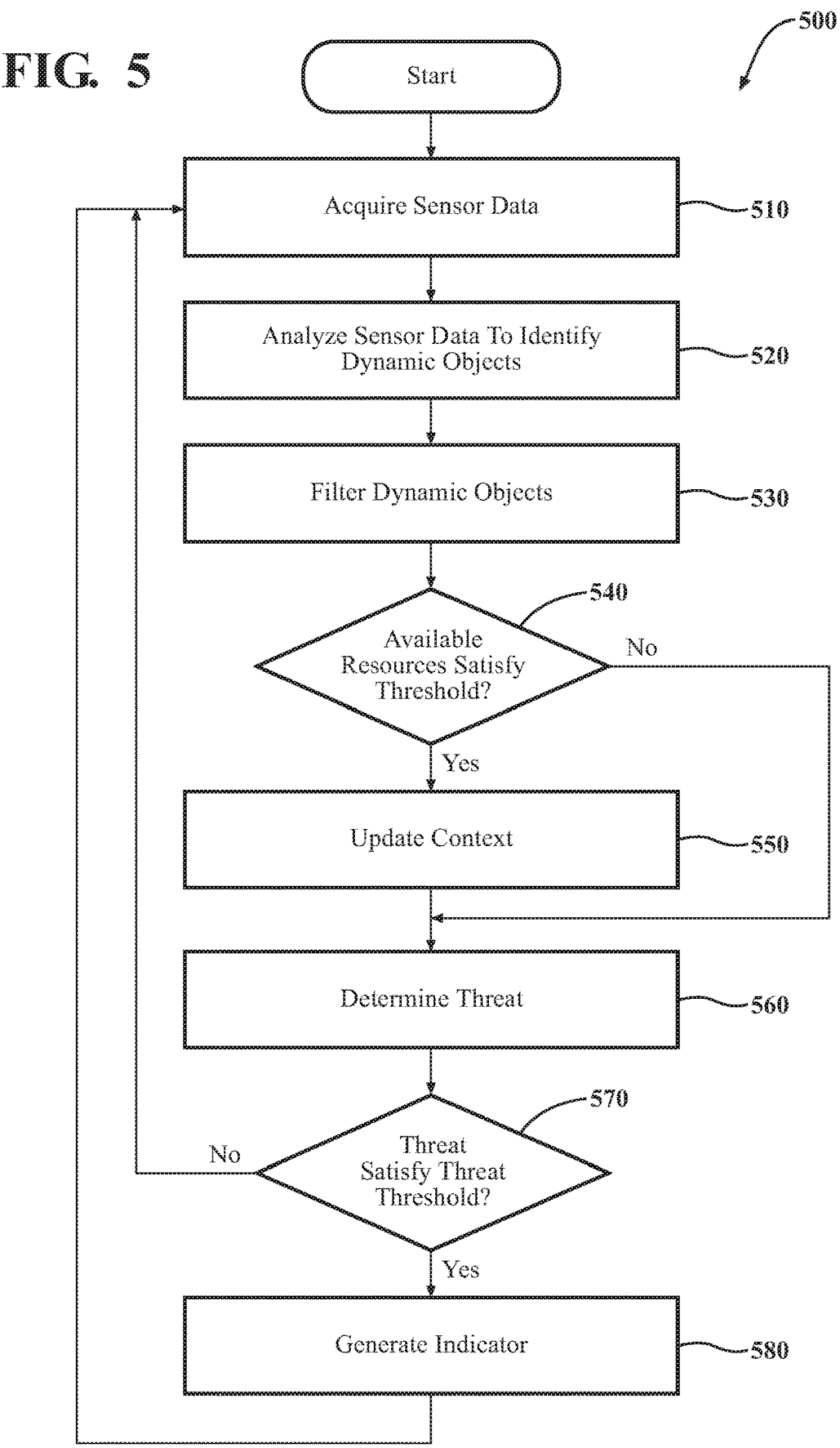
FIG. 5 is a flowchart illustrating one embodiment of a method associated with selectively acquiring sensor data and analyzing the sensor data to assess threats to a user.

FIG. 5 illustrates an additional flowchart of a method 500 that is associated with identifying and tracking dynamic objects as discussed in relation to the method 400 of FIG. 4. The method 500 will also be discussed from the perspective of the safety system 170 of FIGS. 1-2. While method 500 is discussed in combination with the safety system 170, it should be appreciated that the method 500 is also not limited to being implemented within the safety system 170 but is instead one example of a system that may implement the method 500.

Blocks 510 and 520 generally correspond with the blocks 410 and 420 of method 400. Thus, the discussion will not be repeated. It should be appreciated, however, that the sensor module 220 functions to acquire and analyze the sensor data 250 on at least a semi-continuous basis in order to maintain an updated assessment of the surrounding environment. Thus, as the user proceeds through the environment, the sensor module 220 is automatically collecting and analyzing the sensor data 250 to identify the dynamic objects every, for example, 0.1 seconds.

Thus, in order to ensure that the system 170 is consuming resources of the device 100 efficiently, the system 170 monitors available resources, as discussed subsequently, and selectively performs various functions. While primarily discussed in relation to updating the contextual information, the sensor module 220, in one embodiment, also selectively acquires and analyzes the sensor data 250 according to available resources. That is, by way of example, when resources are determined to be unavailable or only marginally available, the sensor module 220 can throttle the collection and analysis of the sensor data 250 by delaying the intervals at which the sensor data 250 is collected (e.g., from 0.1 s to 0.2 s). In this way, the sensor module 220 can selectively conserve resources of the device 100 including, for example, processor resources, battery life, and so on.

Continuing with method 500, at 530, the threat module 230 filters the dynamic objects from subsequent analysis. That is, the sensor module 220 may broadly identify the dynamic objects as any objects in the surrounding environment that are moving. However, such an approach can, in some cases, lead to wasted resources since various dynamic objects may be moving away from the user or be situated such that interaction with the user is impractical or highly improbable. Thus, the threat module 230, in one approach, analyzes the set of identified dynamic objects and filters dynamic objects from the set that are determined to be irrelevant (e.g., unlikely to encounter the user). The threat module 230 may define the criteria for filtering differently according to various approaches; however, in one example, the threat module 230 assesses whether the separate dynamic objects are moving toward the user or away from the user and filters out those that are moving away and are thus unlikely to interact with the user.

In further aspects, the threat module 230 considers further criteria when filtering the dynamic objects such as a type of the object (e.g., vehicle, pedestrian, trash blowing in the wind, etc.) and filters the objects from the set that are, for example, benign objects, which even if they were to collide with the user would be unlikely to cause injury. Moreover, in addition to filtering the objects from the subsequent determinations, in one embodiment, the threat module 230 controls the sensor module 220 to filter the noted dynamic objects from further analysis as well. Accordingly, the threat module 230 can control execution of various tasks in the system 170 to further conserve resources.

At 540, the threat module 230 determines whether available resources of the device 100 satisfy a resource threshold to proceed with acquiring and updating contextual information. In one embodiment, the resource threshold defines a minimum amount of available processor bandwidth over a defined period of time to perform the context updating (e.g., that is consumed in performing the noted task). That is, if, for example, utilization of the processor is under 20% for a defined period, then the threat module 230 proceeds to update the context at 550 since sufficient resources are available to perform the processing while, for example, still providing for processing of other system tasks by the device 100. Otherwise, the threat module 230 skips updating the context and proceeds with determining whether the dynamic objects pose a threat at 560 and 570. In further examples, and, as previously noted, the threat module 230 considers further criteria such as, without limitation, remaining battery life, available memory, and so on. Overall, the threat module 230 assesses available resources to ensure the desired additional task can be, for example, executed without interruption while also not over consuming battery life and/or other resources that would leave the device 100 inoperative or otherwise without sufficient resources to continue operating.

At 550, the threat module 230 updates contextual information about the surrounding environment according. In one embodiment, the threat module 230 updates the contextual information by, for example, directly acquiring portions of the sensor data 250 that form the contextual information or causing the sensor module 250 to acquire the contextual information. Thus, the threat module 230 acquires information to facilitate localizing the user in the surrounding environment in relation to perceived aspects of the surrounding environment including at least a road. Consequently, in one approach, the threat module 230 acquires GPS data and compares the locations with a map to identify whether the user is on a sidewalk, in a roadway, etc.

Moreover, the threat module 230, in one approach, further identifies traffic, traffic control, interactions between the one or more objects, and a configuration of a road from the mapped location (i.e., from map data and relative locations of contextual aspects to the user) and/or from the images acquired as part of the sensor data 250. Thus, in one approach, updating the contextual information can include performing additional processing (i.e., image recognition) over the sensor data 250 to identify traffic signs/lights, how many lanes are in a roadway, the presence of bike lanes, presence of curbs, and other contextual information. Subsequently, the threat module 230 uses the contextual information (e.g., a specific location of the user and obstacles around the user) to supplement prediction of the trajectories for the dynamic objects.

At 560, the threat module 230, similar to block 430 of method 400, analyzes the dynamic objects to determine potential threats within the surrounding environment. Moreover, at 560, the threat module 230 considers the contextual information when available. Thus, the threat module 230 predicts the trajectories for the dynamic objects to account for variations in paths of the one or more objects due to the contextual information. Accordingly, when predicting/extrapolating the trajectories, the threat module 230 accounts for traffic signs/lights, lanes in roads, curbs, sidewalks, and other aspects of the surrounding environment identified by the contextual information. In this way, the threat module 230 can provide more accurate determinations about threats while, for example, maintaining efficient operation on a mobile platform such as the device 100.

Blocks 570 and 580 are similar to the functionality discussed at blocks 440 and 450 of method 400, respectively. Therefore, the discussion of the corresponding functions will not be duplicated. However, it should be appreciated that the threat module 230 determines the threats and provides the indicators while accounting for available resources of the device 100 in order to improve the situational awareness of the user.

Figure 6:
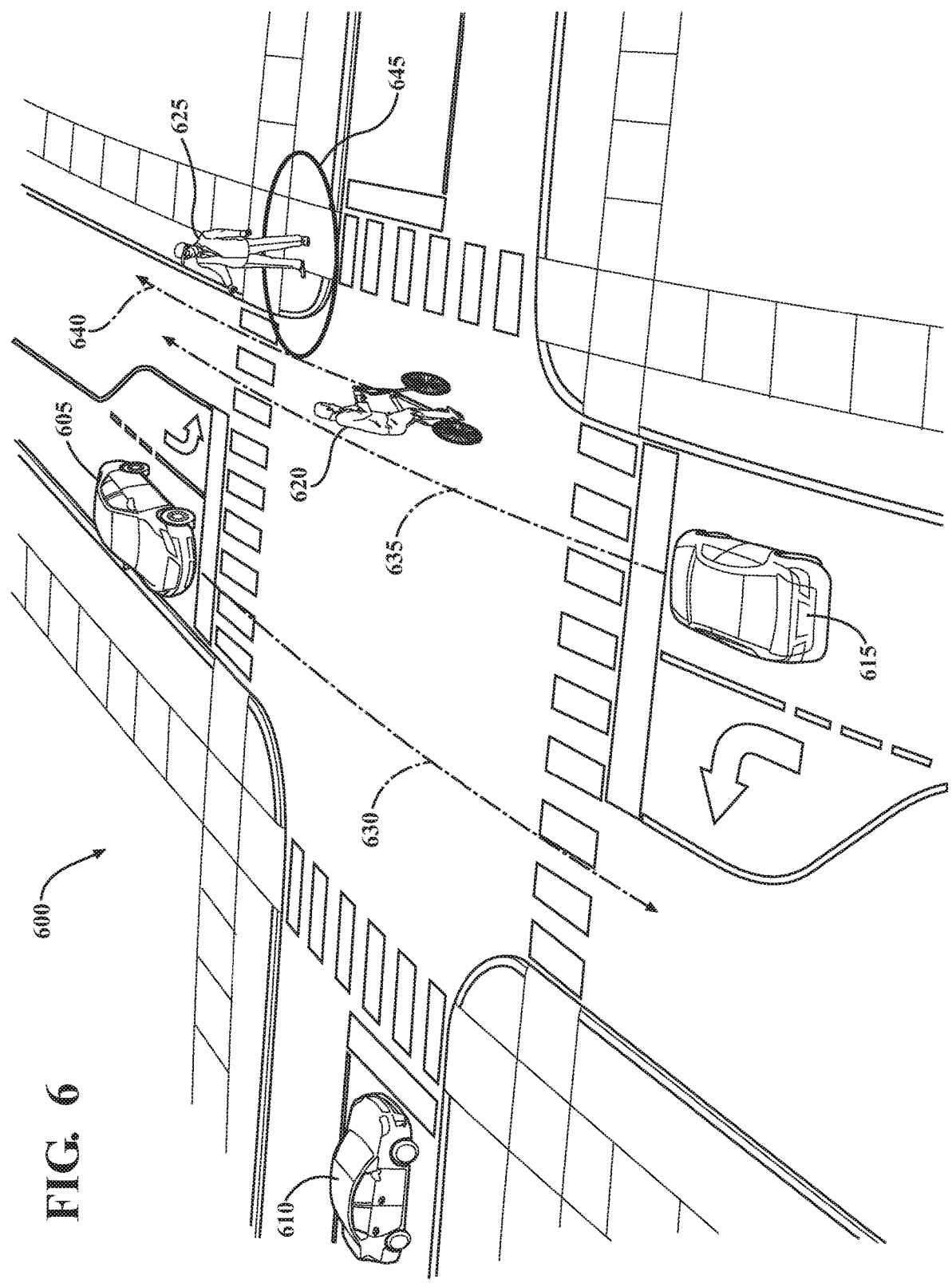
FIG. 6 illustrates one example of a transportation-based environment in which the noted systems and methods may operate.

As a further explanation of how the safety system 170 improves situational awareness of the user consider FIG. 6, which illustrates an exemplary transportation-based environment in which a pedestrian (i.e., the user) benefits from the systems and methods disclosed herein. As shown in FIG. 6, an intersection 600 is illustrated. The intersection 600 is the crossing of two roadways that include vehicles 605, 610, and 615. The intersection 600 further includes a bicyclist 620 and a pedestrian 625. The pedestrian 625 is equipped with the device 100 including the safety system 170 while wearing the accessories (i.e., hat 300 and glasses 310 of FIG. 3) including sensors to provide the sensor data 250 embodying observations of the intersection 600.

Accordingly, the safety system 170 acquires the sensor data 250 and determines that the vehicles 605, 615, and the bicyclist 620 are dynamic objects while the vehicle 610 is stationary/static. Accordingly, the system 170 proceeds to determine the current states of the dynamic objects from which predicted trajectories/paths 630, 635, and 640 are generated. When determining the threats posed by the dynamic objects (605, 615, 620), the system 170 selectively includes contextual information about the intersection 600 such as the presence of the pedestrian 625 on a sidewalk waiting to cross in a crosswalk.

As noted, the system 170 updates and accounts for the contextual information in the assessment of threats according to the availability of resources on the device 100. Thus, depending on the inclusion of the contextual information, the system 170 may account for the pedestrian 625 being located on a sidewalk and thus shrink the threat threshold 645 to align with a boundary of the crosswalk depending on the particular implementation. Moreover, the contextual information may identify stop signs at all four corners (not illustrated) or a traffic light (not illustrated) in the intersection 600 that influence the determination of the predicted trajectories/paths 630, 635, and 640. For example, the inclusion of contextual information for the determination of the predicted paths may result in adjusting the paths 630 and 635 according to the presence of traffic signs/lights while, in one embodiment, potentially adding/predicting a path for the vehicle 610. In any case, the system 170 determines that the path 640 satisfies the threat threshold defined by a radius/circle 645 about the pedestrian.

Therefore, the system 170 generates an indicator that is displayed visually within AR glasses worn by the pedestrian 625. Accordingly, the proximity of the bicyclist 620 with the pedestrian and potential for a collision is brought to the attention of the pedestrian in order to facilitate avoiding the collision. In this way, the system 170 improves the situational awareness of the pedestrian 625 about the intersection 600. Of course, in further approaches, the system may adapt the threat threshold identified as 645 according to a trajectory of the pedestrian 625 in which case the vehicle 615 may also be considered a threat (e.g., if the pedestrian is moving toward the lane of the vehicle 615 and the path 635. Moreover, other circumstances such as the vehicle 605 moving away from the pedestrian 625 once within the intersection may result in the system 170 no longer tracking the vehicle 605. In this way, the system adapts to circumstances to improve awareness of the pedestrian while providing efficient operation on a mobile platform.

FIG. 1 will now be discussed in full detail as an example environment within which the system and methods disclosed herein may operate. The device 100 can include one or more processors 110. In one or more arrangements, the processor(s) 110 can be a main processor of the device 100. For instance, the processor(s) 110 can be a microprocessor, a microcontroller, or another device that is capable of processing instructions. The device 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be updated to reflect changes within a mapped area.

The one or more data stores 115 can include sensor data 119/250. As will be explained below, the device 100 can include the sensor system 120. The sensor data 119 can relate to one or more sensors of the sensor system 120. In some instances, at least a portion of the map data 116 and/or the sensor data 119 can be located in one or more data stores 115 located onboard the device 100. Alternatively, or in addition, at least a portion of the map data 116 and/or the sensor data 119 can be located in one or more data stores 115 that are located remotely from the device 100.

As noted above, the device 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the device 100 (including any of the elements shown in FIG. 1). The sensor system 120 can acquire data of at least a portion of the external environment of the device 100 (e.g., nearby vehicles).

The sensor system 120 can include any suitable type of sensor. Various examples of different types of sensors will be described herein. However, it will be understood that the embodiments are not limited to the particular sensors described. In one or more arrangements, the sensor system 120 can include one or more accelerometers, one or more gyroscopes, an inertial measurement unit (IMU) 125, a dead-reckoning system, a global navigation satellite system (GNSS), a global positioning system (GPS), a navigation system, and/or other suitable sensors.

Alternatively, or in addition, the sensor system 120 can include one or more environment sensors configured to acquire, and/or sense environment data. "Environment data" includes data or information about the external/surrounding environment in which the device 100 is located or one or more portions thereof. For example, the one or more environment sensors can be configured to detect, quantify and/or sense obstacles in at least a portion of the external environment of the device 100 and/or information/data about such obstacles. Such obstacles may be stationary objects and/or dynamic objects. The one or more environment sensors 122 can be configured to detect, measure, quantify and/or sense other things in the external environment of the device 100, such as, for example, lane markers, signs, traffic lights, traffic signs, lane lines, crosswalks, curbs proximate to the device 100, off-road objects, etc.

Various examples of sensors of the sensor system 120 will be described herein. However, it will be understood that the embodiments are not limited to the particular sensors described. As an example, in one or more arrangements, the sensor system 120 can include one or more cameras 130. In one or more arrangements, the one or more cameras 130 can be high dynamic range (HDR) cameras or infrared (IR) cameras.

The device 100 can include an input system 150. An "input system" includes any device, component, system, element or arrangement or groups thereof that enable information/data to be entered into a machine. The device 100 can include an output system 160. An "output system" includes any device, component, or arrangement or groups thereof that enable information/data to be presented to a person such as displays, audio systems, haptic systems, and so on.

The device 100 can include a navigation system 140 can include one or more devices, applications, and/or combinations thereof, now known or later developed, configured to determine the geographic location of the device 100 and/or to determine a travel route for the device 100. The navigation system 140 can include one or more mapping applications to determine a travel route for the device 100. The navigation system 140 can include a global positioning system, a local positioning system or a geolocation system.

The device 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A safety system for improving situational awareness of a user, comprising:
   one or more processors;
   a memory communicably coupled to the one or more processors and storing:
   a sensor module including instructions that when executed by the one or more processors cause the one or more processors to, in response to acquiring, in a personal device proximate to the user, sensor data from a set of sensors that perceive a surrounding environment of the user, and at least one sensor of the set is worn by the user, identify one or more objects in the surrounding environment relative to the user using the sensor data; and
   a threat module including instructions that when executed by the one or more processors cause the one or more processors to:
   determine a threat to the user from the one or more objects according to at least trajectories of the one or more objects embodied in the sensor data, and
   generate, via the personal device, an indicator to inform the user of the one or more objects according to the threat, wherein the safety system is integrated with the personal device.

2. The safety system of claim 1, wherein the threat module includes instructions to selectively update contextual information about the surrounding environment according to resources of the personal device that are presently available, and wherein the resources include processor availability for the one or more processors in the personal device that is used by the safety system for determining the threat.

3. The safety system of claim 2, wherein the threat module includes instructions to selectively update the contextual information including instructions to localize the user in the surrounding environment in relation to perceived aspects of the surrounding environment including at least a road.

4. The safety system of claim 2, wherein the threat module includes instructions to determine the threat including instructions to predict the trajectories to account for variations in paths of the one or more objects due to the contextual information including traffic, traffic control, interactions between the one or more objects, and a configuration of a road.

5. The safety system of claim 1, wherein the sensor module includes instructions to identify the objects including instructions to localize the objects within the surrounding environment relative to the user, and
   wherein the threat module includes instructions to determine the threat to the user including instructions to compute current states of the one or more objects including at least the trajectories for the one or more objects.

6. The safety system of claim 1, wherein the threat module includes instructions to determine the threat including instructions to predict the trajectories for the one or more objects out to a prediction horizon in order to determine whether the one or more objects are following paths that intersect with the user.

7. The safety system of claim 1, wherein the threat module includes instructions to generate the indicator including instructions to determine whether the trajectories of the one or more objects satisfy a threat threshold that defines an acceptable proximity of the one or more objects to a predicted user trajectory of the user, and
   wherein the threat module includes instructions to generate the indicator including instructions to control a display in the personal device to render the indicator in relation to a respective one of the one or more objects associated with the threat.

8. The safety system of claim 1, wherein the threat module includes instructions to determine the threat including instructions to filter the one or more objects to remove benign objects that have attributes indicating the benign objects will not likely affect the user, and
   wherein the sensor module includes instructions to identify the one or more objects including instructions to select types of objects in the surrounding environment from the sensor data that pose potential hazards to the user.

9. The safety system of claim 1, wherein the set of sensors including at least two cameras, and
   wherein the personal device is a smart phone that wirelessly communicates with the set of sensors.

10. A non-transitory computer-readable medium for improving situational awareness of a user and including instructions that when executed by one or more processors cause the one or more processors to:
   in response to acquiring, in a personal device proximate to the user, sensor data from a set of sensors that perceive a surrounding environment of the user, and at least one sensor of the set is worn by the user, identify from the sensor data one or more objects in the surrounding environment relative to the user;
   determine a threat to the user from the one or more objects according to at least trajectories of the one or more objects embodied in the sensor data; and
   generate, via the personal device, an indicator to inform the user of the one or more objects according to the threat, wherein the one or more processors are integrated with the personal device.

11. The non-transitory computer-readable medium of claim 10, wherein the instructions further include instructions to selectively update contextual information about the surrounding environment according to resources of the personal device that are presently available, and wherein the resources include processor availability for the one or more processors in the personal device that is used by the personal device for determining the threat.

12. The non-transitory computer-readable medium of claim 11, wherein the instructions to selectively update the contextual information include instructions to localize the user in the surrounding environment in relation to perceived aspects of the surrounding environment including at least a road, and
   wherein the instructions to determine the threat include instructions to predict the trajectories to account for variations in paths of the one or more objects due to the contextual information including traffic, traffic control, interactions between the one or more objects, and a configuration of a road.

13. The non-transitory computer-readable medium of claim 10, wherein the instructions to generate the indicator including instructions to determine whether the trajectories of the one or more objects satisfy a threat threshold that defines an acceptable proximity of the one or more objects to a predicted user trajectory of the user, and wherein the instructions to generate the indicator include instructions to control a display in the personal device to render the indicator in relation to a respective one of the one or more objects associated with the threat.

14. A method for improving situational awareness of a user, comprising:

in response to acquiring, in a personal device proximate to the user, sensor data from a set of sensors that perceive a surrounding environment of the user, and at least one sensor of the set is worn by the user, identifying from the sensor data one or more objects in the surrounding environment relative to the user;

determining, by the personal device, a threat to the user from the one or more objects according to at least trajectories of the one or more objects embodied in the sensor data; and generating, via the personal device, an indicator to inform the user of the one or more objects according to the threat.

15. The method of claim 14, wherein identifying the objects includes localizing the objects within the surrounding environment relative to the user, and wherein determining the threat to the user includes computing current states of the one or more objects including at least the trajectories for the one or more objects.

16. The method of claim 14, wherein determining the threat includes predicting the trajectories for the one or more objects out to a prediction horizon in order to determine whether the one or more objects are following paths that intersect with the user, wherein generating the indicator includes determining whether the trajectories of the one or more objects satisfy a threat threshold that defines an acceptable proximity of the one or more objects to a predicted user trajectory of the user, and wherein generating the indicator includes controlling a display in the personal device to render the indicator in relation to a respective one of the one or more objects that is associated with the threat.

17. The method of claim 14, further comprising:

selectively updating contextual information about the surrounding environment according to resources of the personal device that are presently available, wherein the resources include processor availability for a processor in the personal device that is used for determining the threat.

18. The method of claim 17, wherein selectively updating the contextual information includes localizing the user in the surrounding environment in relation to perceived aspects of the surrounding environment including at least a road.

19. The method of claim 17, wherein determining the threat includes predicting the trajectories to account for variations in paths of the one or more objects due to the contextual information including traffic, traffic control, interactions between the one or more objects, and a configuration of a road.

20. The method of claim 14, wherein determining the threat includes filtering the one or more objects to remove benign objects that have attributes indicating the benign objects will not likely affect the user, and wherein identifying the one or more objects includes selecting types of objects in the surrounding environment from the sensor data that pose potential hazards to the user.

* * * * *